United States Patent
Dai et al.

(10) Patent No.: US 7,550,058 B2
(45) Date of Patent: Jun. 23, 2009

(54) METHOD OF MANUFACTURING ALDEHYDE-FREE ENGINEER WOOD FLOOR

(76) Inventors: Wubing Dai, 1 Block of Southlake Middle Garden, Chaoyang District, Beijing (CN) 100000; Weifeng Mao, 1 Block of Southlake Middle Garden, Chaoyang District, Beijing (CN) 100000

( * ) Notice: Subject to any disclaimer, the term of this patent is extended or adjusted under 35 U.S.C. 154(b) by 442 days.

(21) Appl. No.: 11/381,134

(22) Filed: May 2, 2006

(65) Prior Publication Data

US 2007/0125484 A1 Jun. 7, 2007

(30) Foreign Application Priority Data

Dec. 6, 2005 (CN) .......................... 2005 1 0127882

(51) Int. Cl.
*B32B 37/00* (2006.01)
(52) U.S. Cl. ................. 156/327; 156/330.9; 156/331.4; 156/331.7; 156/311
(58) Field of Classification Search ................. 156/154, 156/327, 330.9, 331.4, 331.7, 311
See application file for complete search history.

(56) References Cited

U.S. PATENT DOCUMENTS

2004/0082706 A1* 4/2004 Tsai et al. ................... 524/503

* cited by examiner

*Primary Examiner*—Jeff H Aftergut
(74) *Attorney, Agent, or Firm*—Kile Goekjian Reed & McManus PLLC

(57) ABSTRACT

The present invention relates to the technical field of manufacturing engineer wood floor for indoor decoration, and in particular to a manufacturing method that does not release any dissociated formaldehyde. The manufacturing steps are as the followings: Mix the adhesive agent; pour the mixed adhesive agent on a glue spreader at the linear velocity of ≦20 meters/minute; deliver the wooden middle boards to the glue spreader to carry out spreading glue; superimpose wooden middle boards having been coated with glue longitudinally and latitudinally, and deliver them to a cold press for cold press; put the rough middle boards having been coldly pressed on a hot press for hot pressing, in order to make them become base material of engineer wood floor; Stick decorative surface material on the base material of engineer wood floor in order to make them become a engineer wood floor; and form, paint, and pack the engineer wood floor finally.

7 Claims, 1 Drawing Sheet

METHOD OF MANUFACTURING ALDEHYDE-FREE ENGINEER WOOD FLOOR

BACKGROUND OF THE INVENTION

The present invention relates to the technical field of manufacturing engineer wood floor for indoor decoration, and in particular to a manufacturing method that does not release any dissociated formaldehyde.

With the improvement of their living standard, people also set forth a higher requirement for the decoration of their housing or work places. They not only require that the decorations are artistic, trendy, fashionable, natural, and succinct, but also green and of environmental protection. As a kind of up-scale decorative material, the engineer wood floor has been widely applied day by day. As for the normal engineer wood floor on the present market, its formaldehyde releasing quantity has basically met the state standard, but still has other harmful release. The decorative materials or appliances used for housing or work places, such as furniture, wallpaper, wooden window, coating material and so on, will release a large quantity of harmful matters together, which surpasses the state standard when several kinds of them are used at an identical place, even though the harmful release meets the state standard individually. That will seriously threaten the people's health.

BRIEF SUMMARY OF THE INVENTION

The goal of the invention aims at the shortcomings of existing technique, and provides a method of manufacturing aldehyde-free solid wood sandwich floor without formaldehyde and other poisonous and harmful release.

Vinyl acetate and multi-methylphenyl isocyanate used at Step a are not permitted to contain any formaldehyde, and not permitted to be stirred in an active metal container, either, instead, they should be stirred in a plastic barrel. The manufacturing method of aldehyde-free engineer wood floor described in the invention is realized as the following steps:

a. Mix the adhesive agent first, namely mix vinyl acetate with multi-methylphenyl isocyanate or other formaldehyde-free glue at the ratio of 10:1, and evenly stir them with a mixer at a rotation speed of $\leqq 500$ rpm; The mixed adhesive agent must be used out within one hour, and otherwise the residual agent beyond the deadline should be discarded;

b. Pour the mixed adhesive agent on a glue spreader at the linear velocity of $\leqq 20$ meters/minute;

c. Deliver the dried, processed and formaldehyde-free wooden middle boards/fibers, wood-wool, and other materials to the glue spreader to carry out spreading glue;

d. Superimpose wooden middle boards/fibers, wood-wool, and other materials having been coated with glue longitudinally and latitudinally; and then deliver them to a pre-press/cold press with the rating press force of $\geqq 600$ tons, and press them coldly for over 30 minutes with the pressure of $\geqq 15$ kg/cm$^2$;

e. Put the rough boards, which is composed of multilayered wooden middle boards/fibers, wood-wool, and other materials to be coldly pressed, on a hot press with the rating press force of $\geqq 600$ tons; Press them hotly with the pressure of $\geqq 13$ kg/cm$^2$, at 110-115° C., and for a time equal to the thickness (unit: mm) of the board multiplied by 1.5 (unit: minute); Keep the hotly pressed rough boards in the present condition for 15 days, and then cut off the untidy parts of four sides of each board; The rough board is made as base material of engineer wood floor;

f. Stick decorative surface material to engineer wood floor. Sand the base material of the floor as thick as the desired thickness with an allowance error of ±0.05 mm first; and deliver the base material to the glue spreader to carry out spreading glue; and adhibit the wood veneer of desired kind, or decorative material to the glued base material; and deliver them to a cold press with the rating press force of $\geqq 600$ tons and press them coldly for over 30 minutes with the pressure 15 kg/cm$^2$; and then deliver them to a hot press with the rating press force of $\geqq 600$ tons; and press them hotly with the pressure of $\geqq 13$ kg/cm$^2$, at the hot-pressing temperature of 110-115° C., and for a time equal to the thickness (unit: mm) of the board multiplied by 1.5 (unit: minute).

g. Form, paint, and pack the engineer wood floor.

Vinyl acetate and multi-methylphenyl isocyanate used at Step a are not permitted to contain any formaldehyde, and not permitted to be stirred in an active metal container, either, instead, they should be stirred in a plastic or stainless steel barrel.

The linear velocity of the glue spreader at Step b should not be faster than 20 m/minute to avoid the mixed glue from clustering or resolving due to an over-fast linear velocity.

"Make formaldehyde free" described at Step c is such a kind of method that eliminates the formaldehyde contained in wood by steaming, boiling, soaking, and other ways with ammonia ion or other formaldehyde scavengers.

The pressing force of the pre-press/cold press at Step d should reach up to 600 tons, and press the materials coldly for over 30 minutes to make the glue layers cure preliminarily.

The processing concept of hot press described at Step e is almost the same as that described at Step d, the unique difference is that the rough boards must be kept in the present conditions for 15 days due to the stress generated by the hot pressing.

The adhesive agent used for sticking decorative surface material at Step f should be identical to that used at Step a.

All of the paints used for painting process at Step g should be formaldehyde-free.

The engineer wood floor manufactured by means of the above-mentioned method, basically reaches the goal of no formaldehyde release. So it significantly reduces the risk that leads to cancers because the quantity of poisonous and harmful matter, contained in the decorative materials used for work places and housing exceeds the regulated standard; and realizes the purpose of environmental protection and health. Moreover, this kind of engineer wood floor has also the advantages of wet-proof, waterproof, abrasion resistance, and good stability.

DETAILED DESCRIPTION OF THE INVENTION

Figure 1:
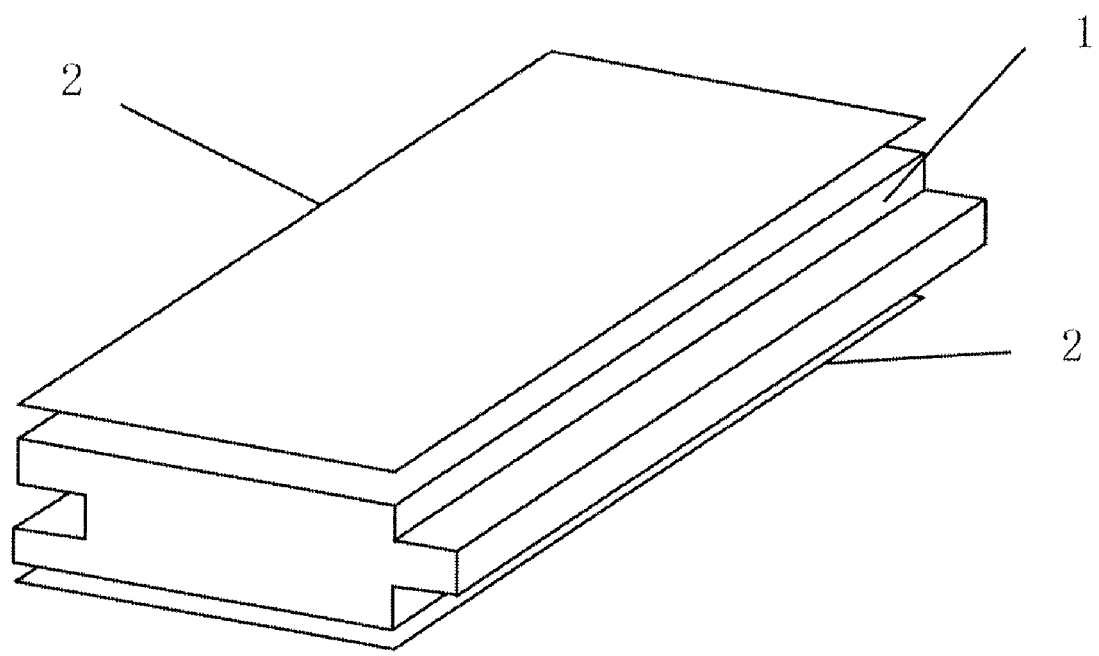
FIG. 1 is the structural diagram of the invention 1. the flooring base materials . . . 2. the floor decorative surface materials

1. The tools and equipments to be used are normal production equipments of plywood boards and engineer wood floor (such as cold press for plywood board, hot press, sanding machine, edge saw machine, and etc.; Complex stick and press equipments; 4-side planer for formation, double-end mill, sanding machine, panel saw, and etc.; Sanding machine, roll spreader, curtain coater, various kinds of UV dryer, and other coating equipments for painting workshop).

2. The materials to be used are various kinds of plywood board, high-density board, wood-wool board, wooden plastic board, BC grade of solid wood, integrated material, gypsum board and other base materials; The adhesive agents to be used are vinyl acetate, multi-methylphenyl isocyanate, or other adhesive agents without formaldehyde or glue particles/strips without formaldehyde, paint or coating without formaldehyde, and color concentrates or dyestuff without formaldehyde.

3. Craft process: Mix the adhesive agent first, namely mix vinyl acetate with multi-methylphenyl isocyanate or other formaldehyde-free glue at the ratio of 10:1, and evenly stir them with a mixer at a rotation speed of ≦500 rpm. The glue containers must not be made of active metal instead, they should be made of plastics or stainless steel. The mixed adhesive agent must be used out within one hour, and otherwise the residual agent beyond the deadline should be discarded. Then carry out the manufacturing of the engineer wood floor as the following steps:

A. Process of the base materials of the engineer wood floor:
a. Pour the mixed adhesive agent mentioned above on a glue spreader at the linear velocity of ≦20 meters/minute, and deliver the dried and formaldehyde-free wooden middle boards/fibers, wood-wool, and other materials to the glue spreader to carry out spreading glue; b. Superimpose (the thickness depends on the requirement of order) wooden middle boards/fibers, wood-wool, and other materials having been coated with glue, and deliver them to a cold press with the rating press force of ≧600 tons, and press them coldly for over 30 minutes (with the pressure of ≧15 kg/cm$^2$), then deliver them on a hot press with the rating press force of ≧600 tons. Press them hotly with the pressure of ≧13 kg/cm$^2$, at 15° C., and for a time equal to the thickness (unit: mm) of the board multiplied by 1.5 (unit: minute). Tiny amount of formaldehyde would completely escape out under the condition of the high temperature and high pressure for a long time. Keep the hotly pressed rough boards in the present condition for 15 days, and then cut off the untidy parts of four sides of each board. The rough board is made as base material of engineer wood floor.

B. Process of the surface compounding: a. Sand the base material of the floor mentioned at Step A as thick as the desired thickness with an allowance of ±0.05 mm, then deliver the base material mentioned at Sub-step a of Step A to the glue spreader for spreading glue. b. Adhibit the wood veneer of desired kind, and decorative material to the glued base material. Carry out cold and hot press according to the method, craft, and condition parameters mentioned at Sub-step b of Step A. Tiny amount of formaldehyde in rough boards must much more completely escape out under the condition of the second high temperature and high pressure for a long time once more. So the floor will be one without formaldehyde. The hotly pressed rough boards will be kept in the present condition for 15 days at least, and then delivered to the next step for cutting.

C. Process of formation: Cut the rough materials at the above mentioned Step B with a multi-blade saw, deliver the small scale of rough material cut to a 4-side planer for chasing mortise longitudinally, and then deliver them to a double-end mill for chasing mortise latitudinally.

D. Process of painting: Spread UV paint to the tenoned engineer wood floor mentioned at the above mentioned Step C. It is worthy to note that all of the UV paint, other coating material, color concentrates, dyestuff, packing material, and other materials should not contain any formaldehyde at all.

The specification of the engineer wood floor manufactured by the mentioned method in the invention is rectangle, square rectangle, and diamond or irregular shape.

The engineer wood floor manufactured by the mentioned method in the invention is composed of the flooring base material 1 and the flooring decorative surface material 2.

The materials of the flooring base material 1 are plywood board, high-density board, wood-wool board, BC grade of solid wood, wooden plastic material, gypsum board, residual wood material processed, and integrated material.

The materials of the flooring decorative surface material 2 are the veneer of any kind of wood, single board, decorative paper, abrasion-resistance paper, or other decorative materials.

What is claimed is:

1. A method of manufacturing an aldehyde-free engineer wood floor, characterized in that the method of manufacturing aldehyde-free engineer wood floor comprising the steps of:
    a. mixing an adhesive agent first, comprising a mixture of vinyl acetate with multi-methylphenyl isocyanate or other formaldehyde-free glue at a ratio of 10:1, and evenly stirring them with a mixer at a rotation speed of ≦500 rpm; wherein said adhesive agent is mixed in an inactive such as plastic or stainless steel vessel or barrel; wherein the adhesive agent mixed must be used out within one hour, and residua of the adhesive agent beyond said hour should be discarded;
    b. pouring the mixed adhesive agent on a glue spreader at the linear velocity of ≦20 meters/minute;
    c. delivering dried, processed and formaldehyde-free wooden middle boards/fibers, wood-wool, and other materials to the glue spreader to carry out spreading glue;
    d. superimposing wooden middle boards/fibers, wood-wool, and other materials having been coated with glue longitudinally and latitudinally; and feeding the same to a pre-press/cold press with the rating press force of ≧600 tons, and press them coldly for over 30 minutes with the pressure of ≧15 kg/cm$^2$ thereby forming rough boards;
    e. putting the rough boards, which is composed of multi-layered wooden middle boards/fibers, wood-wool, and other materials having been coldly pressed, on a hot press with a rating press force of ≧600 tons, and pressing them hotly with a pressure of ≧13 kg/cm$^2$, at 110-115° C., and for a time equal to a thickness (unit: mm) of the rough board multiplied by 1.5 (unit: minute); maintaining the hotly pressed rough boards in the present condition for 15 days, and then cut off any untidy parts of four sides of each board; the rough board is made as base material of engineer wood floor;
    f. sticking decorative surface material on the base material and sanding the flooring base material as thick as a desired thickness with an allowance error of ±0.05 mm first; delivering the base material to the glue spreader to carry out spreading glue; adhering a wood veneer of the desired kind, or decorative material to the glued base material to form an assembly; delivering the assembly to a pre-press/cold press with a rating press force of ≧600 tons and pressing the assembly coldly for over 30 minutes with a pressure of 15 kg/cm$^2$ at least; delivering the assembly to a hot press with the rating press force of ≧600 tons; then pressing the assembly hotly with a pressure of ≧13 kg/cm$^2$, at 110-115° C., and for a time equal to a thickness (unit: mm) of the board multiplied by 1.5 (unit: minute).
    g. form, paint, and pack the engineer wood floor.

2. A method of manufacturing aldehyde-free engineer wood floor in accordance with claim 1, characterized in that vinyl acetate and multi-methylphenyl isocyanate are not permitted to contain any formaldehyde.

3. A method of manufacturing aldehyde-free engineer wood floor in accordance with claim 1, characterized in that the formaldehyde-free wooden middle boards/fibers, wood-wool, and other materials described at step c is such a kind of method that eliminates the formaldehyde contained in wood by steaming, boiling, soaking, and other ways with ammonia ion or other formaldehyde scavenger.

4. A method of manufacturing aldehyde-free engineer wood floor in accordance with claim 1 characterized in that all of the paint, coating material, color concentrates, dyestuff, packing material, and other materials used for painting process at step g should not contain any formaldehyde at all.

5. A method of manufacturing aldehyde-free engineer wood floor in accordance with claim 1, characterized in that the engineer wood floor manufactured by the method in the invention is any of a shape of a rectangle, square rectangle, and diamond.

6. A method of manufacturing aldehyde-free engineer wood floor in accordance with claim 1, characterized in that the materials of the flooring base material are plywood board, high-density board, wool board, BC grade of solid wood, wooden plastic material, gypsum board, residual wood material processed, and integrated material.

7. A method of manufacturing aldehyde-free engineer wood floor in accordance with claim 1, characterized in that the materials of the flooring decorative surface material are the wood veneer of any kind, single board, decorative paper, abrasion-resistance paper.

* * * * *